M. J. NELSON.
EGG TIMER.
APPLICATION FILED NOV. 18, 1919.

1,343,738. Patented June 15, 1920.

Inventor
Martin J. Nelson

By
Attorney.

UNITED STATES PATENT OFFICE.

MARTIN J. NELSON, OF RYE, NEW YORK.

EGG-TIMER.

1,343,738.

Specification of Letters Patent.  Patented June 15, 1920.

Application filed November 18, 1919. Serial No. 338,912.

*To all whom it may concern:*

Be it known that I, MARTIN J. NELSON, a citizen of the United States of America, residing at Rye, in the county of Westchester and State of New York, have invented certain new and useful Improvements in Egg-Timers, of which the following is a specification.

The primary object of the invention is the provision of an egg timer in which the eggs are prevented from being forced out of the receiving pockets during the boiling operation, thereby saving trouble and expense from breaking and losing the eggs.

A further object of the invention is the provision of an attachment readily adapted for different forms of egg timers now in use in the nature of guards for the boiling eggs within the steamer of the egg boiler, the device being simple in construction and easy and inexpensive to manufacture.

With these general objects in view and others that will appear as the nature of the invention is better understood, the same consists of the novel combination and arrangement of parts hereinafter more fully described in connection with the accompanying drawing and then claimed.

Figure 1:
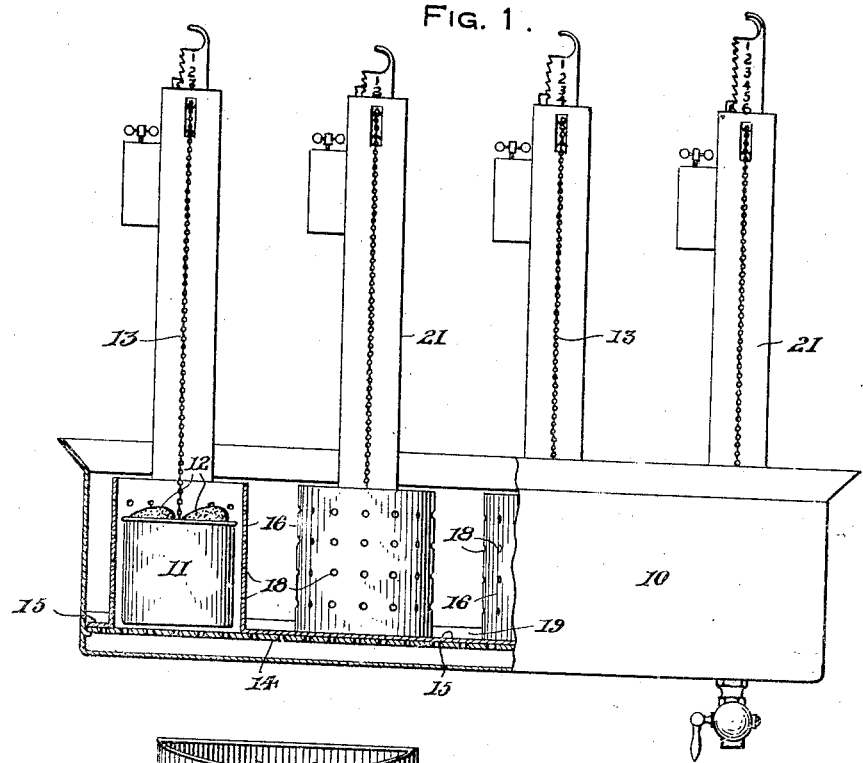
Figure 2:
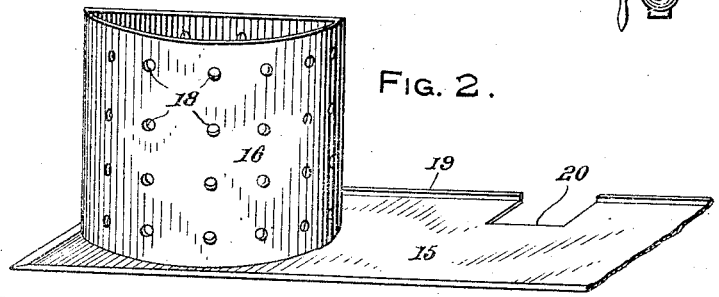
Figure 3:
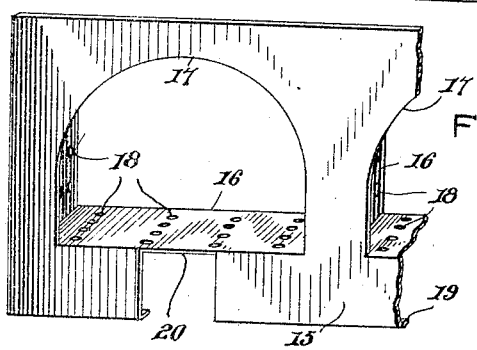

In the drawing forming a part of this application and in which like reference characters designate corresponding parts throughout the several views, Figure 1 is an elevational view of one form of egg timer with my invention installed thereon, parts being broken away, Fig. 2 is a perspective view of an end portion of the invention, and Fig. 3 is an inverted perspective view thereof.

It being understood that my invention is an attachment for egg cooking machinery more especially for an egg timer, one form of egg timer is herein illustrated in Fig. 1 having my invention installed thereon, said timer consisting of a boiler or steamer 10 with pockets or buckets 11 for holding the eggs 12 suspended by connectors 13 associated with clock work for elevating the buckets 11 above the steamer 10 at the expiration of a predetermined length of time of boiling. The buckets 11 are normally positioned seated upon or closely adjacent to the perforated bottom or grid 14 within the steamer 10 and many times during the boiling of the eggs 12, the eggs will be forced out of the buckets 11 by the steam and heat in the boiler 10 and the eggs wasted in this manner.

My invention is in the nature of an attachment in the form of a plate 15 adapted for resting upon the false bottom 14 of the boiler 10 with spaced semi-cylindrical casings 16 mounted thereon adapted for the reception of the vertically shiftable buckets 11. The casings 16 are substantially semi-cylindrical in shape conforming to that of the buckets 11 but of greater dimensions, a casing 16 being positioned in axial alinement with each bucket 11 employed in the egg timer. The casings 16 are open at both ends, the heating fluid readily passing through the perforated false bottom 14 of the boiler 10 and through substantially semi-circular openings 17 in the plate 15 for surrounding the buckets 11 and cooking the eggs 12, it being noted that perforations 18 are provided in the casings 16. A marginal flange 19 is provided at the rear edge of the plate 15 which flange together with the plate 15 is provided with notches 20 for accommodating the upright posts 21 of the egg timer. It will be understood that when the invention is in its operative position, a casing 16 will be positioned forwardly of and adjacent to each of the posts 21 while the portions of the flange 19 will be positioned between said posts 21. My attachment will be closely fitted in this manner within the boiler 10 for normally maintaining its assembled relation but forcibly removed when the occasion requires.

The complete operation of the invention will be fully understood from this detail description thereof, it being seen that the plate 15 and casings 16 are formed of zinc or heavy tin and that the device is placed in the steamer in the manner herein illustrated for lowering the buckets 11 filled with eggs 12 into the respective casings 16 therebeneath. The eggs are prevented from leaving the buckets 11 and becoming broken in the boiler 10 by means of the protecting casings 16 while the casings being foraminous as well as the false bottom 14 insures the cooking of the eggs by boiling while the buckets 11 are being withdrawn from the casings 16 when the eggs 12 have been boiled for a predetermined time in accordance with the usual operation of the egg timing machinery. Waste is prevented by my device which is easy and inexpensive to manufacture as well as install in egg timers, and while the form of the invention herein set forth is believed to be the preferable embodiment thereof, it is nevertheless to be understood that minor changes may be made therein without departing from the spirit and scope of my invention.

What I claim as new is:—

1. A device of the class described comprising a plate adapted for seating within the boiler of an egg timer and perforated casings upon the plate positioned within the paths of movement of the egg buckets and projecting above the level of the eggs positioned in the buckets when the egg timer is in operation.

2. An attachment for egg timers comprising a plate adapted for seating adjacent the bottom of an egg timer, a plurality of upright casings upon the plate adapted to receive the vertically movable egg buckets of the timer therein, the said plate having openings in substantial alinement with said casings and the casings having a plurality of perforations therethrough.

3. An attachment for egg timers comprising a plate having notches in one edge thereof, substantial semi-cylindrical casings mounted upon the plate adjacent the inner ends of said notches, the said casings being perforated and the plate having openings therethrough substantially alining with said casings.

4. In combination with an egg timer having a foraminous bottom and upright posts and with vertically movable egg receiving buckets, vertically adjustably carried by said posts, a plate mounted upon said bottom having spaced notches in one edge adapted for fitting around said posts when the plate is in position upon said bottom, and substantial semi-tubular perforated casings mounted upon the plate inwardly of said notches within the paths of travel of the egg buckets and adapted for the reception of the buckets within the casings during the egg boiling operation.

5. In combination with an egg timer having a foraminous bottom and upright posts and with vertically movable egg receiving buckets, vertically adjustably carried by said posts, a plate mounted upon said bottom having spaced notches in one edge adapted for fitting around said posts when the plate is in position upon said bottom, substantial semi-tubular perforated casings mounted upon the plate inwardly of said notches within the paths of travel of the egg buckets and adapted for the reception of the buckets within the casings during the egg boiling operation, and an upturned marginal flange upon the plate fitting between said posts when the device is assembled, the casings being of greater height than the buckets and surrounding the buckets when in use whereby the eggs are prevented from passing from the buckets into the boiler of the timer during operation.

In testimony whereof I affix my signature.

MARTIN J. NELSON.